United States Patent
Satoh

(10) Patent No.: US 7,640,129 B2
(45) Date of Patent: Dec. 29, 2009

(54) INFORMATION PROCESSING APPARATUS AND INFORMATION PROCESSING METHOD

(75) Inventor: Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/045,824

(22) Filed: Mar. 11, 2008

(65) Prior Publication Data

US 2008/0228422 A1      Sep. 18, 2008

(30) Foreign Application Priority Data

Mar. 13, 2007    (JP)    ............... 2007-063960

(51) Int. Cl.
*G06F 19/00*    (2006.01)
*G06K 9/20*    (2006.01)

(52) U.S. Cl. ........................... 702/95; 382/312

(58) Field of Classification Search .................. 702/95; 382/154, 312; 345/663
See application file for complete search history.

(56) References Cited

U.S. PATENT DOCUMENTS

2003/0182072 A1*    9/2003    Satoh et al. ................... 702/95

2005/0069196 A1*    3/2005    Uchiyama et al. ........... 382/154

FOREIGN PATENT DOCUMENTS

JP    2003-269913    9/2003

* cited by examiner

*Primary Examiner*—Bryan Bui
(74) *Attorney, Agent, or Firm*—Cowan, Liebowitz & Latman, P.C.

(57) ABSTRACT

A calibration information calculation unit (540) calculates a plurality of candidates of first coordinate transformation information using a plurality of candidates of second coordinate transformation information, a sensor measured value, and the position and orientation of a video camera (100) on the world coordinate system. The calibration information calculation unit (540) then calculates a piece of first coordinate transformation information by combining the plurality of calculated candidates. Then, the calibration information calculation unit (540) makes iterative calculations for correcting calibration information using a candidate of the second coordinate transformation information and the first coordinate transformation information as initial values of the calibration information.

12 Claims, 5 Drawing Sheets

INFORMATION PROCESSING APPARATUS AND INFORMATION PROCESSING METHOD

This application claims the benefit of Japanese Patent Application No. 2007-063960 filed Mar. 13, 2007, which is hereby incorporated by reference herein in its entirety.

BACKGROUND OF THE INVENTION

1. Field of the Invention

The present invention relates to a technique for calibrating the measurement results of a sensor which measures the three-dimensional position and orientation.

2. Description of the Related Art

Studies about mixed reality presenting a result obtained by superimposing text and CGs on a physical space have been extensively made. An image display apparatus that presents mixed reality can be implemented as an apparatus which superposes and renders, onto an image sensed by an image sensing device, an image generated according to the position and orientation of this image sensing device.

In order to implement such image display apparatus, the relative position and orientation between a world coordinate system defined on the physical space and a camera coordinate system defined on the image sensing device need to be measured in real time. For example, a case will be examined below wherein a virtual object is superimposed at a predetermined position in a physical environment such as that in a room or on a table. In this case, a world coordinate system is defined on an appropriate place (e.g., the floor surface of a room or the table surface) in that environment, and the position and orientation of the image sensing device on the world coordinate system can be measured. As means for attaining such measurements, three-dimensional (3D) position and orientation sensors such as a magnetic sensor, optical sensor, ultrasonic sensor, and the like are popularly used.

In general, measured values output from the 3D position and orientation sensor are the position and orientation of a survey point (measurement point) on a coordinate system uniquely defined by the sensor (to be referred to as a sensor coordinate system hereinafter), and are not those of the image sensing device on the world coordinate system. For example, taking the magnetic sensor FASTRAK available from Polhemus as an example, the position and orientation of a receiver on a coordinate system defined by a transmitter are obtained as sensor outputs.

Therefore, the sensor measured values cannot be used as the position and orientation of the image sensing device on the world coordinate system as is, and they need to undergo some calibration (transformation). More specifically, the sensor measured values need to undergo the following two coordinate transformations.

The first coordinate transformation transforms the position and orientation on the sensor coordinate system into those on the world coordinate system. Information required to implement the first coordinate transformation (to be referred to as first coordinate transformation information hereinafter) includes the relationship between the positions and orientations of the world coordinate system and sensor coordinate system. This information is expressed by, for example, the position and orientation of the sensor coordinate system on the world coordinate system.

On the other hand, the second coordinate transformation transforms the position and orientation of the survey point to those of the image sensing device. Information required to implement the second coordinate transformation (to be referred to as second coordinate transformation information hereinafter) includes the relationship between the positions and orientations of the image sensing device and survey point. This information is expressed by, for example, the position and orientation of the survey point on a coordinate system defined by the image sensing device (to be referred to as a camera coordinate system hereinafter). In this specification, these pieces of information required to transform the sensor measured values into the position and orientation of the image sensing device on the world coordinate system will be generically referred to as "calibration information" hereinafter.

Patent reference 1 discloses a method of easily measuring calibration information of the 3D position and orientation sensor attached to the image sensing device. This method is implemented by the following sequence.

(1) Indices whose 3D coordinates (to be referred to as world coordinates hereinafter) on the world coordinate system are given are allocated or set in a scene.

(2) The measured values of the 3D position and orientation sensor and images sensed by the image sensing devices at a plurality of different viewpoint positions are simultaneously acquired.

(3) The indices are detected from the acquired images, and actually measured values (to be referred to as observation coordinates hereinafter) of image coordinates of the detected indices are acquired.

(4) Approximate values of the first coordinate transformation information and second coordinate transformation information as calibration information of the 3D position and orientation sensor are input, and are used as initial estimated values.

(5) As for the respective detected indices, the image coordinates (to be referred to as projected coordinates hereinafter) of the indices are calculated based on their 3D coordinates, the measured values of the 3D position and orientation sensor, and the current estimated values of the calibration information, and errors between the projected coordinates and observation coordinates are calculated.

(6) The estimated values of the calibration information are corrected to minimize the sum total of the errors.

(7) The processes (5) and (6) are repeated until the correction process (6) converges.

With this method, by providing rough values of the calibration information, high-precision calibration information can be obtained without using any special calibration jig.

Patent reference 1 discloses a simple measure for avoiding manual input operations of the approximate values of the calibration information. In this measure, some patterns as the approximate values of the calibration information are prepared in advance.

These approximate values are set as initial estimated values in turn to execute the processes (5) to (7), and the calibration information upon convergence of the correction process is selected.

[Patent Reference 1] Japanese Patent Laid-Open No. 2003-269913

However, with the method of patent reference 1, the approximate values of the first coordinate transformation information and second coordinate transformation information as the calibration information to be calculated need to be input, resulting in cumbersome operations. If the input approximate values are far from actual values, the correction calculations do not converge, and the calibration information cannot be obtained.

With the method of preparing some patterns in advance as the approximate values of the calibration information, when the prepared approximate values are far from actual values, the correction calculations do not converge, and the calibration information cannot be obtained. In particular, the relationship between the positions and orientations of the world coordinate system and sensor coordinate system as the first coordinate transformation information has a very high degree of freedom, and it is difficult in practice to prepare initial values that can converge in all cases.

SUMMARY OF THE INVENTION

The present invention has been made in consideration of the aforementioned problems, and has as its object to provide a technique for easily and reliably acquiring calibration information without externally inputting the approximate values of the first coordinate transformation information and second coordinate transformation information.

According to one aspect of the present invention, an information processing apparatus comprises:

an image acquisition unit adapted to acquire a physical space image obtained by sensing a physical space on which a plurality of indices whose world coordinates are known are allocated using an image sensing device;

a coordinate acquisition unit adapted to acquire image coordinates of the indices in the physical space image with reference to the image sensing device;

a position and orientation acquisition unit adapted to acquire a position and orientation of a survey point on the image sensing device in a coordinate system with reference to a sensor measured by the sensor;

a candidate acquisition unit adapted to acquire a plurality of candidates of second transformation information required to transform between a coordinate system with reference to the image sensing device and a coordinate system with reference to the survey point;

an estimation unit adapted to calculate an estimated value of a position and orientation of the image sensing device on the world coordinate system using the acquired image coordinates of the indices and the positions of the indices on the world coordinate system;

a calculation unit adapted to calculate first transformation information used to transform between the coordinate system with reference to the sensor and the world coordinate system using a selected one of the second transformation information selected from among the plurality of candidates of the second transformation information, the measured value of the position and orientation, and the estimated value of the position and orientation; and a correction unit adapted to make iterative calculations for correcting calibration information used to calibrate the position and orientation in the coordinate system with reference to the sensor to the world coordinate system using, as initial values of the calibration information, the selected second transformation information and the calculated first transformation information.

According to another aspect of the present invention, an information processing apparatus for calculating calibration information of a sensor used to measure a position and orientation of an image sensing device, the apparatus comprises:

an input unit adapted to input measured values of the sensor at different positions and orientations of the image sensing device;

an acquisition unit adapted to acquire actually measured values of coordinates of a plurality of feature points included in images sensed by the image sensing device at the different positions and orientations; and a calculation unit adapted to calculate the calibration information based on the plurality of measured values input by the input unit, the plurality of actually measured values acquired by the acquisition unit, and pre-stored world coordinates of the plurality of feature points, wherein the calibration information includes first transformation information used to transform a position and orientation on a sensor coordinate system based on the sensor into a position and orientation on a world coordinate system, and second transformation information used to transform a position and orientation as measured values of a survey point by the sensor into a position and orientation on a coordinate system based on the image sensing device, and the calculation unit comprises:

a first calculation unit adapted to calculate a position and orientation of the image sensing device based on the actually measured values of the coordinates of the feature points acquired by the acquisition unit and the world coordinates of these feature points at least at one position and orientation of the different positions and orientations;

a first setting unit adapted to set approximate values of the second transformation information;

a second calculation unit adapted to calculate approximate values of the first transformation information corresponding to the approximate values of the second transformation information set by the first setting unit based on the position and orientation of the image sensing device calculated by the first calculation unit and the measured values of the sensor at these position and orientation; and a correction unit adapted to correct the calibration information based on the measured values of the sensor at the different positions and orientations input by the input unit and the actually measured values of the coordinates of the feature points at the different positions and orientations acquired by the acquisition unit using, as initial values of the calibration information, the approximate values of the second transformation information set by the first setting unit, and the approximate values of the first transformation information calculated by the second calculation unit.

According to still another aspect of the present invention, an information processing method comprises:

an image acquisition step of acquiring a physical space image obtained by sensing a physical space on which a plurality of indices whose world coordinates are known are allocated using an image sensing device;

a coordinate acquisition step of acquiring image coordinates of the indices in the physical space image with reference to the image sensing device;

a position and orientation acquisition step of acquiring a position and orientation of a survey point on the image sensing device in a coordinate system with reference to a sensor measured by the sensor;

a candidate acquisition step of acquiring a plurality of candidates of second transformation information required to transform between a coordinate system with reference to the image sensing device and a coordinate system with reference to the survey point;

an estimation step of calculating an estimated value of a position and orientation of the image sensing device on the world coordinate system using the acquired image coordinates of the indices and the positions of the indices on the world coordinate system;

a calculation step of calculating first transformation information used to transform between the coordinate system with reference to the sensor and the world coordinate system using a selected one of the second transformation information from among the plurality of candidates of the second transformation information, the measured value of the position and orientation, and the estimated value of the position and orientation; and a correction step of making iterative calculations for correcting calibration information used to calibrate the position and orientation in the coordinate system with reference to the sensor to the world coordinate system using, as initial values of the calibration information, the selected second transformation information and the calculated first transformation information According to yet another aspect of the present invention, an information processing method for calculating calibration information of a sensor used to measure a position and orientation of an image sensing device, the method comprises:

an input step of inputting measured values of the sensor at different positions and orientations of the image sensing device;

an acquisition step of acquiring actually measured values of coordinates of a plurality of feature points included in images sensed by the image sensing device at the different positions and orientations; and a calculation step of calculating the calibration information based on the plurality of measured values input in the input step, the plurality of actually measured values acquired in the acquisition step, and pre-stored world coordinates of the plurality of feature points, wherein the calibration information includes first transformation information used to transform a position and orientation on a sensor coordinate system based on the sensor into a position and orientation on a world coordinate system, and second transformation information used to transform a position and orientation as measured values of a survey point by the sensor into a position and orientation on a coordinate system based on the image sensing device, and the calculation step comprises:

a first calculation step of calculating a position and orientation of the image sensing device based on the actually measured values of the coordinates of the feature points acquired in the acquisition step and the world coordinates of these feature points at least at one position and orientation of the different positions and orientations;

a first setting step of setting approximate values of the second transformation information;

a second calculation step of calculating approximate values of the first transformation information corresponding to the approximate values of the second transformation information set in the first setting step based on the position and orientation of the image sensing device calculated in the first calculation step and the measured values of the sensor at these position and orientation; and a correction step of correcting the calibration information based on the measured values of the sensor at the different positions and orientations input in the input step and the actually measured values of the coordinates of the feature points at the different positions and orientations acquired in the acquisition step using, as initial values of the calibration information, the approximate values of the second transformation information set in the first setting step, and the approximate values of the first transformation information calculated in the second calculation step.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

In this embodiment, a case will be described wherein a calibration apparatus (information processing apparatus) for generating calibration information of a 3D position and orientation sensor is applied to an image display apparatus which provides (displays) a composite image of a virtual space image and physical space image to the user. More specifically, this calibration apparatus is built in the image display apparatus, in order to obtain the position and orientation of a viewpoint used when the image display apparatus generates the virtual space image.

Figure 1:
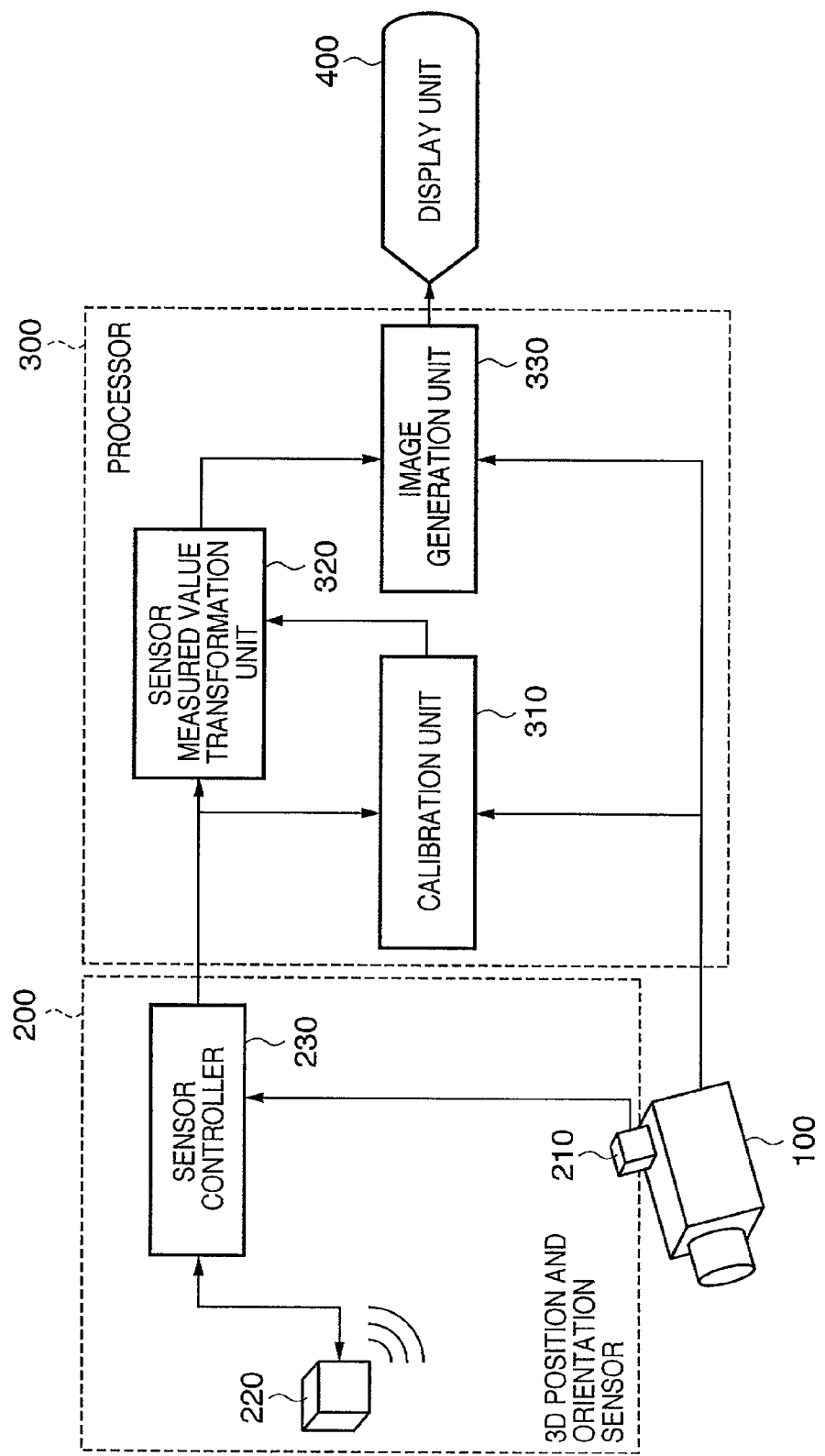
FIG. 1 is a block diagram showing the functional arrangement of an image display apparatus according to the first embodiment of the present invention.

FIG. 1 is a block diagram showing the functional arrangement of an image display apparatus according to this embodiment. As shown in FIG. 1, the image display apparatus according to this embodiment comprises a video camera 100 as an image sensing device, a 3D position and orientation sensor 200, a processor 300, and a display unit 400. The image display apparatus according to this embodiment generates a virtual space image according to the position and orientation of the video camera 100, composites the generated virtual space image to a physical space image sensed by the video camera 100, and outputs the composite image to the display unit 400.

The 3D position and orientation sensor 200 will be described first.

The 3D position and orientation sensor 200 measures the position and orientation of a survey point on a sensor coordinate system, and comprises a receiver 210, transmitter 220, and sensor controller 230. In this embodiment, FASTRAK available from Polhemus is used as the 3D position and orientation sensor 200. However, the following description can be applied similarly even when sensors of other types such as an optical sensor, ultrasonic sensor, and the like are used.

The transmitter 220 is allocated to be fixed at a predetermined position on the physical space so as to have a predetermined orientation, and generates a specific magnetic field under the control of the sensor controller 230 to be described later. The sensor coordinate system is defined by the position of the transmitter 220. For example, the sensor coordinate system has the position of the transmitter 220 on the physical space as an origin, and defines three axes orthogonal to each other at that origin as x-, y-, and z-axes, respectively. Since the sensor coordinate system is known to those who are skilled in the art, no more explanation will be given.

The receiver 210 is fixed on the video camera 100 as a survey point, and measures the magnetic field generated by the transmitter 220. This measurement result differs depending on the position and orientation of the receiver 210. The receiver 210 then outputs the measurement result to the sensor controller 230 as a signal.

The sensor controller 230 controls the operation of the transmitter 220, and calculates the position and orientation of the receiver 210 on the sensor coordinate system based on the measurement result (measured magnetic field) indicated by the signal received from the receiver 210. The sensor controller 230 then outputs position and orientation information indicating the calculated position and orientation to a sensor measured value transformation unit 320 and calibration unit 310 included in the processor 300 in the next stage.

The processor 300 will be described below. As shown in FIG. 1, the processor 300 comprises the calibration unit 310, the sensor measured value transformation unit 320, and an image generation unit 330. To the processor 300, the video camera 100, 3D position and orientation sensor 200, and display unit 400 are connected. Therefore, the processor 300 receives data of the physical space image sensed by the video camera 100, and the position and orientation information (sensor measured values) measured by the 3D position and orientation sensor 200. The processor 300 outputs data or a signal of a composite image obtained by compositing the physical space image and virtual space image to the display unit 400.

The calibration unit 310 acquires the sensor measured values from the 3D position and orientation sensor 200, and also acquires data of the physical space image from the video camera 100. The calibration unit 310 then estimates calibration information of the 3D position and orientation sensor 200 based on the acquired sensor measured value and physical space image, and outputs the estimated calibration information to the sensor measured value transformation unit 320. Details of the calibration unit 310 will be described later with reference to FIG. 2.

Upon acquisition of the sensor measured values from the 3D position and orientation sensor 200, the sensor measured value transformation unit 320 transforms the sensor measured values into position and orientation information indicating the "position and orientation of the video camera 100 on the world coordinate system" using the calibration information received from the calibration unit 310. The sensor measured value transformation unit 320 then outputs the transformed position and orientation information to the image generation unit 330. The world coordinate system is as described above. More specifically, this coordinate system has one point on the physical space as an origin, and defines three axes orthogonal to each other at the origin as x-, y-, and z-axes.

Details of the processing in the sensor measured value transformation unit 320 will be described below.

In this embodiment, the first coordinate transformation information as one calibration information is described using a position and orientation $M_{TW}$ of the sensor coordinate system on the world coordinate system. The second coordinate transformation information as the other calibration information is described using a position and orientation $M_{SC}$ of the survey point (corresponding to the receiver 210 in this embodiment) of the video camera 100 on the camera coordinate system.

Note that the camera coordinate system is as has been described above. More specifically, the camera coordinate system has the focal point position of the video camera 100 as an origin, and defines a direction opposite to the optical axis as a -z-axis and two axes which are orthogonal to each other at that origin as x- and y-axes.

In the following description, the "position and orientation of the receiver 210 on the sensor coordinate system" as input data (sensor measured values) to the sensor measured value transformation unit 320 are described as $M_{ST}$. The "position and orientation of the video camera 100 on the world coordinate system" as output data from the sensor measured value transformation unit 320 are described as $M_{CW}$. Note that in this specification, the position and orientation of object B on coordinate system A is expressed by a viewing transformation matrix $M_{BA}$ (4×4) from coordinate system A to coordinate system B (a local coordinate system with reference to object B).

Arithmetic processing using such viewing matrix, matrices of other types, vectors, and the like will be described below. In the following description, they will be all handled as data.

The following relational expression is established among $M_{ST}$, $M_{SC}$, $M_{TW}$, and $M_{CW}$:

$$M_{CW}=M_{SC}^{-1} \cdot M_{ST} \cdot M_{TW} \qquad (1)$$

The sensor measured value transformation unit 320 calculates $M_{CW}$ based on expression (1) using $M_{ST}$ input from the 3D position and orientation sensor 200, and $M_{SC}$ and $M_{TW}$ held in advance as calibration information. The unit 320 then outputs the calculated $M_{CW}$ to the image generation unit 330.

The image generation unit 330 acquires a physical space image sensed by the video camera 100 from the video camera 100 as data. Furthermore, the image generation unit 330 acquires $M_{CW}$ as information indicating the "position and orientation of the video camera 100 on the world coordinate system" calculated by the sensor measured value transformation unit 320. The image generation unit 330 then builds a virtual space using data which are held by itself in advance and are required to render respective virtual objects which configure the virtual space. Of course, a coordinate system on this virtual space matches the world coordinate system. The image generation unit 330 generates an image which is seen upon viewing the virtual space from a viewpoint having the position and orientation indicated by $M_{CW}$ as a virtual space image. The image generation unit 330 generates a composite image by superimposing the generated virtual space image on the physical space image acquired from the video camera 100, and outputs the generated composite image to the display unit 400 as a signal or data.

Various techniques for generating a composite image as if virtual objects existed on the physical space by compositing the virtual space image and physical space image have been conventionally proposed. This embodiment is not limited to a specific composition technique, and any composition technique may be used. Of course, some composition methods may require new units to be added to the arrangement shown in FIG. 1, and the arrangement may be changed as needed.

The display unit 400 displays an image based on the signal or data received from the image generation unit 330 on its display screen. The display unit 400 may be a monitor (a display device comprising a CRT, liquid crystal display, or the like) fixed on the physical space, or a display device arranged in an HMD (Head Mounted Display) together with the video camera 100.

Figure 2:
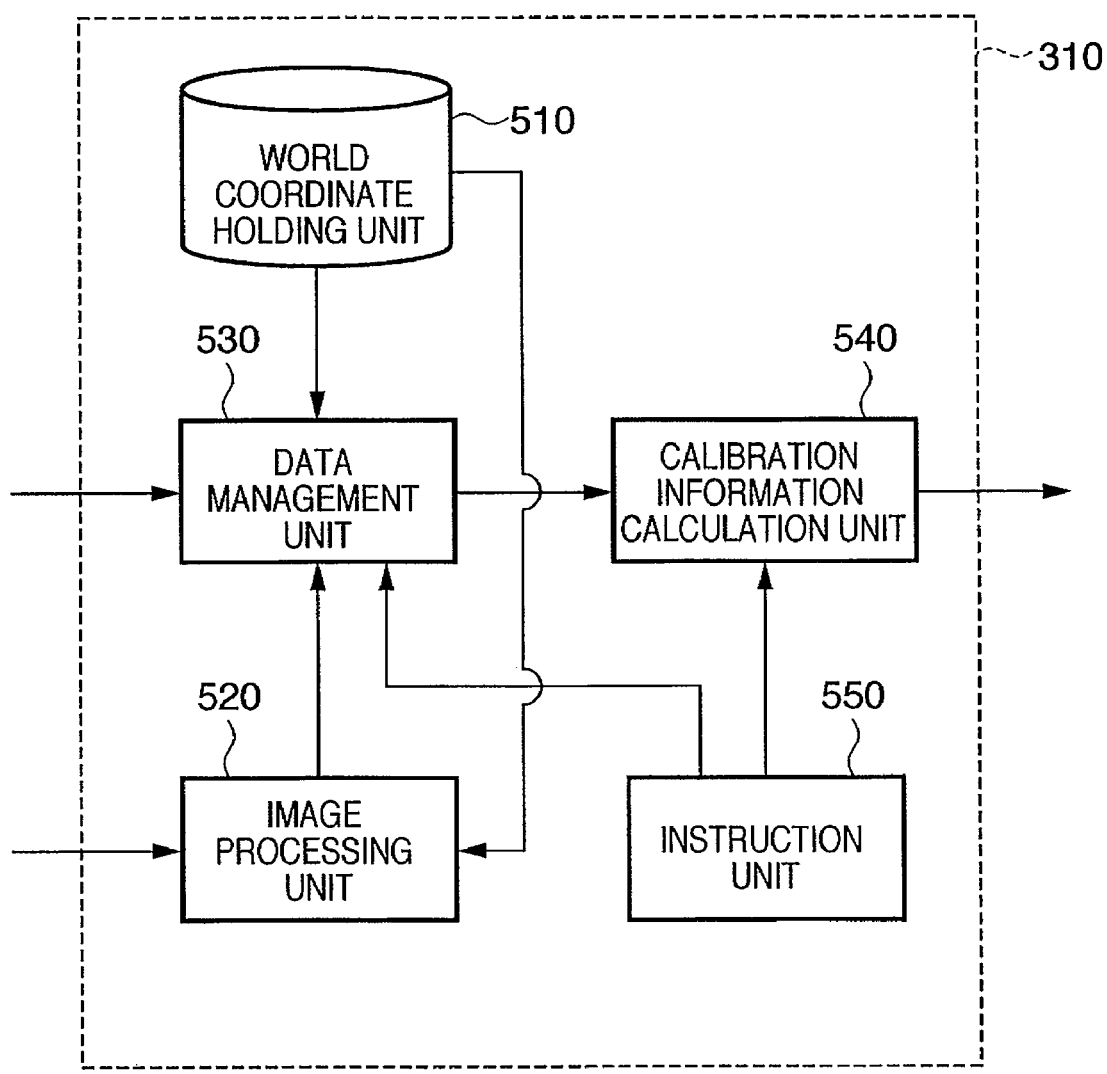
FIG. 2 is a block diagram showing the functional arrangement of a calibration unit 310 according to the first embodiment of the present invention.

Details of the calibration unit 310 will be described below with reference to FIG. 2. FIG. 2 is a block diagram showing the functional arrangement of the calibration unit 310 according to this embodiment. As shown in FIG. 2, the calibration unit 310 according to this embodiment comprises a world coordinate holding unit 510, image processing unit 520, data management unit 530, calibration information calculation unit 540, and instruction unit 550.

In order to calculate the calibration information using the calibration unit 310 of this embodiment, four or more indices (feature points) whose world coordinates are given need to be allocated on the physical space within the image sensing range of the video camera 100. Note that, when the physical space image including the index is acquired, each index is configured so that image coordinates (observation coordinates) of a projected image of the index on the acquired physical space image can be detect and the index can be identified.

These indices are configured by color markers defined by small regions having different colors. Alternatively, these markers are configured by feature points such as natural features and the like having different texture features. The indices may have arbitrary forms as long as the image coordinates of their projected images on a physical space image are detectable, and these indices are identifiable from each other. The indices may be intentionally (artificially) set. The indices may be features such as the corners of a desk, wall pattern, and the like which originally exist on the physical space. A polygonal marker defined by a single-color polygonal region having a certain area may be used. In this case, the vertices of the polygon are used as indices.

The world coordinate holding unit 510 holds pieces of world coordinate information of respective indices, and outputs them in response to a request from the data management unit 530. In the following description, let $x^{Qk}_W$ be the world coordinate information of an index $Q_k$ with an identification number k.

Upon acquisition of a physical space image sensed by the video camera 100, the image processing unit 520 detects respective indices that appear in this physical space image, and calculates their observation coordinates. Then, the unit 520 specifies the identification numbers of the detected indices to identify these indices. The unit 520 outputs acquired information (the identification numbers k and observation coordinates $u^{Qkj}$ of the detected indices) to the data management unit 530.

Note that j (j=1, 2, . . . ) represents an identifier (serial number) assigned to each position and orientation of the video camera 100 so as to distinctively manage data acquired when the video camera 100 is located at different positions and orientations (or at different times). The data management unit 530 (to be described later) issues j incremented by one every time it receives a "data acquisition" instruction from the instruction unit 550 (to be described later), and assigns it to acquired data depending on the position and orientation of the video camera 100.

The following description will be given under the following assumption for the sake of simplicity. That is, a physical space image sensed by the video camera 100 at a certain position and orientation and sensor measured values by the 3D position and orientation sensor 200 with respect to the video camera 100 at that position and orientation are simultaneously input to the image processing unit 520 and data management unit 530, respectively. Therefore, an issuance target of the identifier j may include both the sensor measured value and the physical space image.

When the image processing unit 520 acquires sets of identification numbers and observation coordinates of the four or more indices from one physical space image, it acquires pieces of world coordinate information of the indices corresponding to the calculated identification numbers from the world coordinate holding unit 510. The unit 520 then calculates (estimates) $M^j_{CW}$ as information indicating the position and orientation of the video camera 100 on the world coordinate system based on the sets of world coordinates and observation coordinates of the respective indices. Note that $M^j_{CW}$ indicates that the information is obtained based on the physical space image as the issuance target of the identifier j.

Note that the method of calculating the position and orientation of a camera using the sets of observation coordinates and world coordinates of respective indices is prevalently known in the fields of photogrammetry and computer vision, and a detailed description thereof will not be given. The image processing unit 520 outputs the calculated $M^j_{CW}$ to the data management unit 530.

The indices are detected by methods according to the types of indices to be used. For example, when respective indices are configured by color markers having different colors, regions corresponding to respective marker colors are detected from a physical space image. Then, their barycentric positions are used as detected coordinates (observation coordinates) of the indices. When the indices are configured by feature points having different texture features, the positions (observation coordinates) of the indices are detected by template matching using template images. In this case, the template images of the respective indices are held in advance as given information. When rectangular markers are used, a physical space image undergoes binarization processing and labeling processing to detect label regions each defined by four straight lines as marker candidates. Then, it is checked if the rectangular regions of the respective marker candidates include specific patterns, thereby eliminating detection errors. Also, the identification numbers of the rectangular markers are acquired based on the patterns in the rectangular regions. Finally, the coordinates of the four vertices of each rectangular region are output as the positions (observation coordinates) of four indices.

Upon receiving a "data acquisition" instruction from the instruction unit 550, the data management unit 530 holds sensor measured values $M^j_{ST}$ received from the 3D position and orientation sensor 200 at the first timing after reception of the instruction. Also, the unit 530 receives sets of (identification numbers k and observation coordinates $u^{Qkj}$ of the detected indices) output from the image processing unit 520 at the first timing after reception of the instruction. Furthermore, the unit 530 acquires pieces of world coordinate information $x^{Qk}_W$ of the indices specified by the identification numbers k in these sets from the world coordinate holding unit 510.

The data management unit 530 additionally registers, in a data list, sets of sensor measured values $M^j_{ST}$, observation coordinates $u^{Qkj}$ of the respective detected indices received from the image processing unit 520, and pieces of world coordinate information $x^{Qk}_W$ (of the indices of the identification numbers k) acquired from the world coordinate holding unit 510.

Upon reception of $M^j_{CW}$ from the image processing unit 520 at the first timing after receiving the "data acquisition" instruction, the data management unit 530 holds it to form a set with the sensor measured values received from the 3D position and orientation sensor 200 at the same timing.

The data management unit 530 outputs data which are held and managed by itself to the calibration information calculation unit 540 as needed in response to a request from the unit 540.

Upon receiving a "calibration information calculation" instruction from the instruction unit 550, the calibration information calculation unit 540 acquires data held by the data management unit 530, and calculates and outputs calibration information based on the acquired data. The calibration information calculation unit 540 internally holds a plurality of values $M_{SC}^a$ (a=1, 2, ..., A) as candidates of approximate values of the position and orientation $M_{SC}$ (i.e., second coordinate transformation information) of the receiver 210 on the camera coordinate system of the video camera 100. Note that a is an identifier for each candidate of the approximate values of the second coordinate transformation information, and A represents the total number of candidates of approximate values of the second coordinate transformation information. Details of the processing of the calibration information calculation unit 540 will be described in detail later using the flowchart.

The instruction unit 550 includes a mouse, keyboard, and the like, which are operated by the user of the processor 300 to input various instructions. When the user inputs a data acquisition command by operating the instruction unit 550, the instruction unit 550 transmits the "data acquisition" instruction to the data management unit 530. When the user inputs a calibration information calculation command by operating the instruction unit 550, the instruction unit 550 transmits the "calibration information calculation" instruction to the calibration information calculation unit 540. The user can input such commands to the instruction unit 550 by pressing keys to which specific commands are assigned using, for example, the keyboard. Alternatively, the user may input commands using a GUI displayed on a display (not shown) connected to the processor 300. That is, the command input method is not particularly limited.

Figure 4:
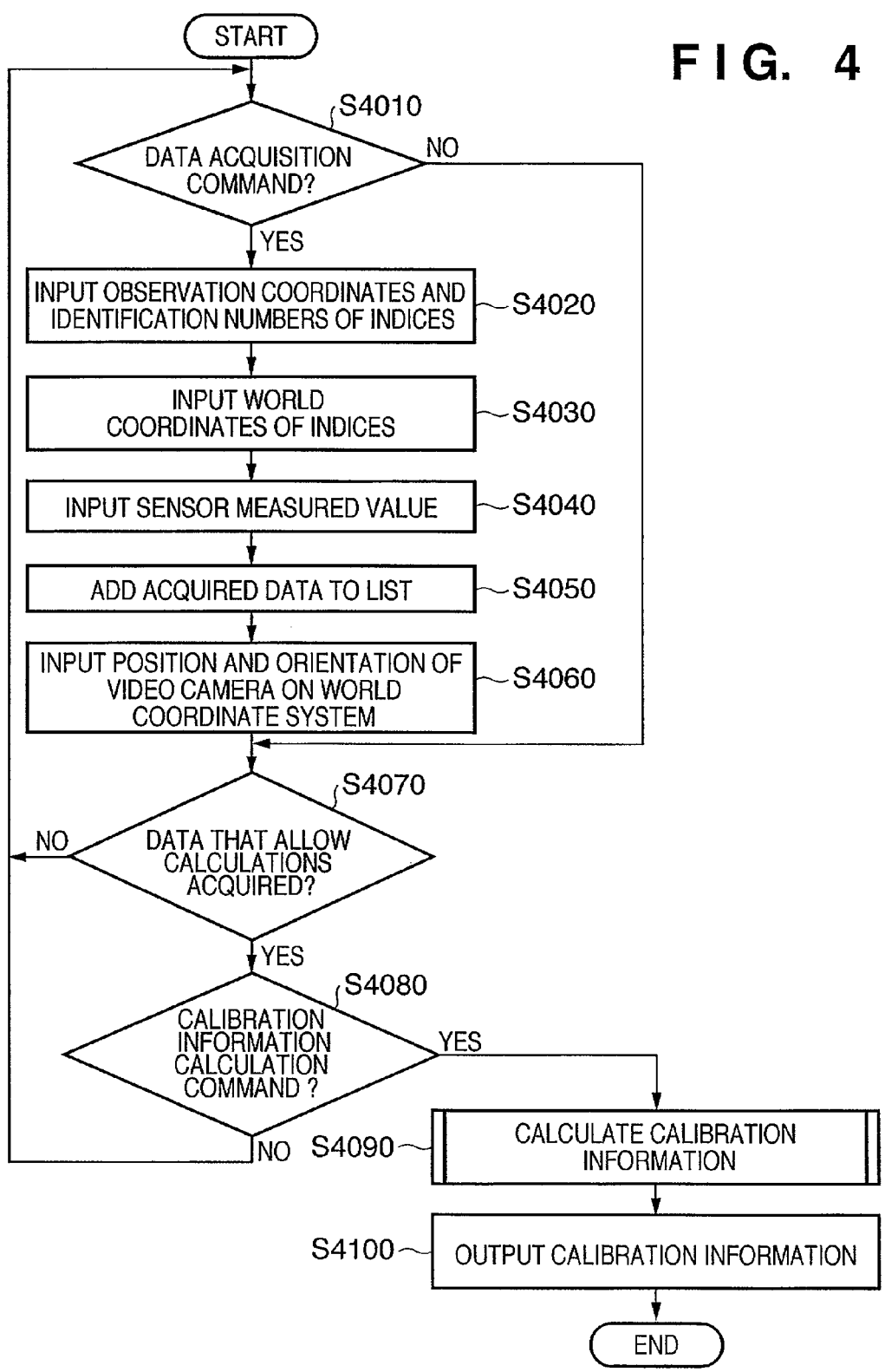
FIG. 4 is a flowchart showing the processing to be executed by the calibration unit 310.

FIG. 4 is a flowchart showing the processing to be executed by the calibration unit 310.

The instruction unit 550 checks in step S4010 if the user inputs a data acquisition command. As a result of checking, if the instruction unit 550 determines that the user inputs the data acquisition command, the process advances to step S4020. The following description will be given under the assumption that the identifier issued by the data management unit 530 at a timing immediately after the input timing of the data acquisition command is j.

On the other hand, if the instruction unit 550 determines as a result of checking that the user does not input any data acquisition command, the process jumps to step S4070.

In step S4020, the data management unit 530 receives sets of (identification numbers k and observation coordinates $u^{Qkj}$ of the detected indices) output from the image processing unit 520 at a timing immediately after the input timing of the data acquisition command. When the image processing unit 520 detects a plurality of indices from one physical space image, and calculates such sets in correspondence with the respective indices, the unit 530 receives the sets for the respective indices. Furthermore, the data management unit 530 assigns the identifier j to the acquired observation coordinates.

In step S4030, the data management unit 530 acquires world coordinates $x^{Qk}{}_W$ of indices $Q_k$ specified by the identification numbers k input from the image processing unit 520 from the world coordinate holding unit 510.

In step S4040, the data management unit 530 acquires sensor measured values $M^j{}_{ST}$ output from the 3D position and orientation sensor 200 at the timing immediately after the input timing of the data acquisition command. Furthermore, the data management unit 530 assigns the identifier j to the acquired sensor measured values $M^j{}_{ST}$.

In step S4050, the data management unit 530 forms a set of the observation coordinates $u^{Qkj}$ received in step S4020, the world coordinates $x^{Qk}{}_W$ received in step S4030, and the sensor measured values $M^j{}_{ST}$ received in step S4050 for each k (for each index $Q_k$). The data management unit 530 registers the set for each k in the data list which is held and managed by itself. More specifically, let $u^i = u^{Qkj} = [u^i_x, u^i_y]^T$ be the observation coordinates of the index $Q_k$. Also, let $x^i_w = x^{Qk}{}_w = [x^i_W, y^i_W, z^i_W, 1]^T$ be the world coordinates of that index. Furthermore, $M^i{}_{ST} = M^j{}_{ST}$ be the sensor measured values that that time. Then, the unit 530 registers a set $[u^i, x^i_W, M^i{}_{ST}]$ in the data list as the i-th data element Di. Note that i indicates a value obtained by adding 1 to the total number of data elements currently registered in the data list.

Such data list is available for each position and orientation at which the video camera 100 is allocated since a new data list is created when the position and orientation of a viewpoint have changed.

In step S4060, the data management unit 530 acquires the "position and orientation $M^j{}_{CW}$ of the video camera 100 on the world coordinate system" input from the image processing unit 520. The unit 530 holds a set $[M^j{}_{ST}, M^j{}_{CW}]$ with the sensor measured values $M^j{}_{ST}$ as data. Such set is also newly created when the position and orientation of the viewpoint have changed. However, this set is not always created, but it is created only when the "position and orientation $M^j{}_{CW}$ of the video camera 100 on the world coordinate system" are input from the image processing unit 520.

With the aforementioned processing, the data required to execute the subsequent processes have been acquired.

The data management unit 530 checks in step S4070 if the data acquired so far include information that suffices to calculate calibration information. If the data do not meet conditions, the process returns to step S4010 to wait for the input of the data acquisition command. On the other hand, if the data satisfy the conditions required to calculate calibration information, the process advances to step S4080.

In order to implement the following calibration processing, data associated with at least three different indices need to be obtained from a plurality of viewpoints. Also, at least at one viewpoint, the set of the position and orientation $M^j{}_{CW}$ of the video camera 100 on the world coordinate system and the sensor measured values $M^j{}_{ST}$ need to be obtained. These conditions as required conditions may be used as criteria, or conditions may be set to require more data.

The calibration information calculation unit 540 checks in step S4080 if a calibration information calculation command is input from the instruction unit 550 by a user's operation. If the command is input, the process advances to step S4090; otherwise, the process returns to step S4010 to wait for the input of a data acquisition command.

In step S4090, the calibration information calculation unit 540 acquires the data accumulated so far by the data management unit 530, and calculates calibration information based on the acquired data. Details of the processing of step S4090 will be described later using the flowchart of FIG. 5.

In step S4100, the calibration information calculation unit 540 outputs the calibration information calculated by the processing in step S4090 to the sensor measured value transformation unit 320.

Figure 5:
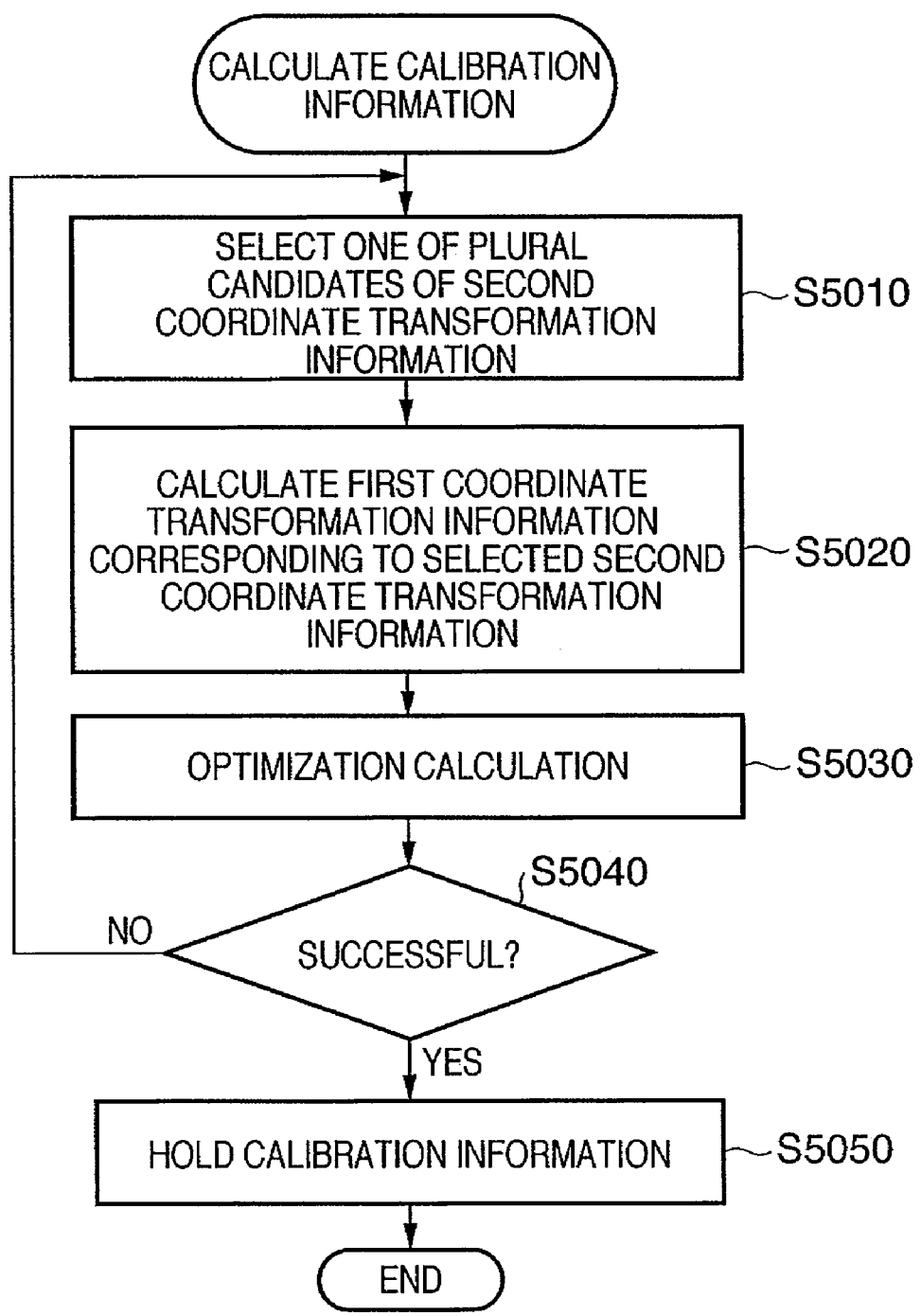
FIG. 5 is a flowchart showing the processing to be executed by a calibration information calculation unit 540 in step S4090.

FIG. 5 is a flowchart showing the processing to be executed, in the step S4090, by the calibration information calculation unit 540.

In step S5010, the calibration information calculation unit 540 selects, as selected candidate information, a candidate $M_{SC}{}^a$, which has not been selected yet, of those of approximate values of the internally held second coordinate transformation information.

As candidates of the approximate values of the second coordinate transformation information, it is effective to prepare 12 different orientations, which make the x-axis of a receiver coordinate system with reference to the position and orientation of the receiver 210 agree with normal directions of respective planes of a regular dodecahedron. Note that the receiver coordinate system has the position of the receiver 210 as an origin, and defines three axes which are orthogonal to each other at that origin as x-, y-, and z-axes. Furthermore, with reference to these 12 different orientations, several different (e.g., eight) orientations obtained by rotating each orientation about the z-axis through every several ten degrees (e.g., 45°) may be prepared.

That is, orientation components of the candidates of the approximate values of the second coordinate transformation information correspond to the orientations of a coordinate system with reference to the position and orientation of the survey point when one axis of that coordinate system agrees with a plurality of directions.

On the other hand, an approximate value of the position suffices to set (0, 0, 0). This is based on the nature that translation components of the second coordinate transformation information have less influence on the calculations of projected coordinates, and optimization calculations easily converge even if there are slight errors. Also, this setting is proper from the fact that the position of the video camera 100 is never extremely separate from that of the survey point (receiver 210). Note that a set of candidates of approximate values of the second coordinate transformation information is not always limited to the above configuration. For example, a regular hexahedron may be used in place of the regular dodecahedron, and other values near the origin may be given as the approximate values of the position.

In step S5020, the calibration information calculation unit 540 calculates $M_{TW}{}^a$ of first coordinate transformation information corresponding to $M_{SC}{}^a$ of the second coordinate transformation information selected in step S5010. This calculation is made as follows.

The calibration information calculation unit 540 inputs one set (data associated with one viewpoint) $[M^j{}_{ST}, M^j{}_{CW}]$ from sets [the sensor measured values—the positions and orientations of the video camera 100 on the world coordinate system] input from the data management unit 530. The unit 540 then calculates $M_{TW}{}^{a,j}$ corresponding to $M_{SC}{}^a$ using $M_{SC}{}^a$ selected in step S5010 by:

$$M_{TW}{}^{a,j} = M^j{}_{ST}{}^{-1} \cdot M_{SC}{}^a \cdot M^j{}_{CW} \quad (2)$$

By repeating the calculation of equation (2) in correspondence with the number of sets $[M^j{}_{ST}, M^j{}_{CW}]$, a plurality of $M_{TW}{}^{a,j}$ values are obtained. By combining the plurality of $M_{TW}{}^{a,j}$ values, $M_{TW}{}^a$ to be calculated is obtained.

The plurality of $M_{TW}{}^{a,j}$ values can be combined by calculating the averages of rotation components and translation components of the respective $M_{TW}{}^{a,j}$ values. Alternatively, $M_{TW}{}^{a,j}$ of the set $[[M^j{}_{ST}, M^j{}_{CW}]$ in which $M^j{}_{CW}$ is estimated with highest reliability may be selected. In this case, the image processing unit 520 needs to calculate the reliability of estimation in association with the position and orientation of the video camera 100. Such reliability can be calculated from the distribution state of the detected indices on an image, which is used in the step of calculating $M^j{}_{CW}$ in the image processing unit 520. For example, the area of a convex hull that includes all detected indices $u^{Qkj}$ can be used as the reliability of $M^j{}_{CW}$.

In step S5030, the calibration information calculation unit 540 executes optimization processing (correction processing) of calibration information using $M_{SC}{}^a$ and $M_{TW}{}^a$ obtained in steps S5010 and S5020 as initial estimated values of the calibration information, thus obtaining pieces of calibration information $M_{SC}$ and $M_{TW}$ after optimization.

The optimization processing in step S5030 is executed so as to minimize the sum total of errors between the observation coordinates and projected coordinates in association with respective data elements Di (sets $[u^i, x^i{}_W, M^i{}_{ST}]$) in the data list. The error evaluation function is given by:

$$e = \Sigma |u^i - f(x^i{}_W, M^i{}_{ST}, M_{SC}, M_{TW})| \quad (3)$$

where f is the observation equation used to calculate the projected coordinates corresponding to the position and orientation of the video camera 100. The f includes viewing transformation and perspective transformation, and the viewing transformation is expressed by:

$$X^i{}_C = M_{SC}{}^{-1} \cdot M^i{}_{ST} \cdot M_{TW} \cdot X^i{}_W \quad (4)$$

On the other hand, the perspective transformation is determined by intrinsic parameters of the video camera 100, and is assumed to have given fixed values in this embodiment. Since unknown parameters of equation (3) are only pieces of calibration information, pieces of calibration information $M_{SC}$ and $M_{TW}$ which minimize errors e can be obtained by applying iterative calculations based on a known nonlinear optimization method such as a Newton method or the like. The detailed sequence of the optimization processing using equation (3) as the error evaluation function is described in, for example, patent reference 1. However, the pieces of calibration information $M_{SC}$ and $M_{TW}$ which minimize errors e can be obtained only when appropriate $M_{SC}{}^a$ and $M_{TW}{}^a$ are given as initial estimated values. Otherwise, the optimization processing does not converge but it diverges, or the processing results in a local solution even if it converges.

The calibration information calculation unit 540 checks in step S5040 if the optimization processing in step S5030 has succeeded. More specifically, if the iterative processing of optimization has converged, and the residual error of projection errors (differences between the observation coordinates and projected coordinates) of indices is equal to or smaller than a predetermined threshold, it is determined that the optimization processing has succeeded. If it is determined that the optimization processing has failed, the process returns to step S5010 to select another candidate as the initial estimated values of the second coordinate transformation information to execute the processes in steps S5020 to S5040 again. On the other hand, if it is determined that the optimization processing has succeeded, the process advances to step S5050.

In step S5050, the calibration information calculation unit 540 holds the calibration information ($M_{SC}$ and $M_{TW}$) obtained by the successful optimization processing determined in step S5040 as a result of the calibration processing.

With the aforementioned processing, the approximate value candidates $M_{SC}{}^a$ of the second coordinate transformation information with a low degree of freedom are held exhaustively, and values which do not conflict with the selected $M_{SC}{}^a$ are acquired by calculations as the initial estimated values $M_{TW}{}^a$ of the first coordinate transformation information with a high degree of freedom. As a result, the optimization calculations are expected to converge using one of the initial estimated values.

With the above processing, the 3D position and orientation sensor 200 can be easily and reliably calibrated without requiring the user to input any approximate values of calibration information.

Second Embodiment

In the description of the first embodiment, the respective units which form the processor 300 shown in FIG. 1 are implemented by dedicated hardware components. However, the respective units which form the processor 300 shown in FIG. 1 may be implemented by programs (computer programs). In this case, such programs are installed in a computer such as a PC (personal computer) or the like, and are executed by a CPU or the like of this computer. As a result, the computer executes respective processes to be implemented by the processor 300 described in the first embodiment. Note that not all but some of units which form the processor 300 shown in FIG. 1 may be implemented by programs.

The programs corresponding to all the units which form the processor 300 shown in FIG. 1 may be installed in one computer or the programs for respective units may be installed in corresponding computers.

Figure 3:
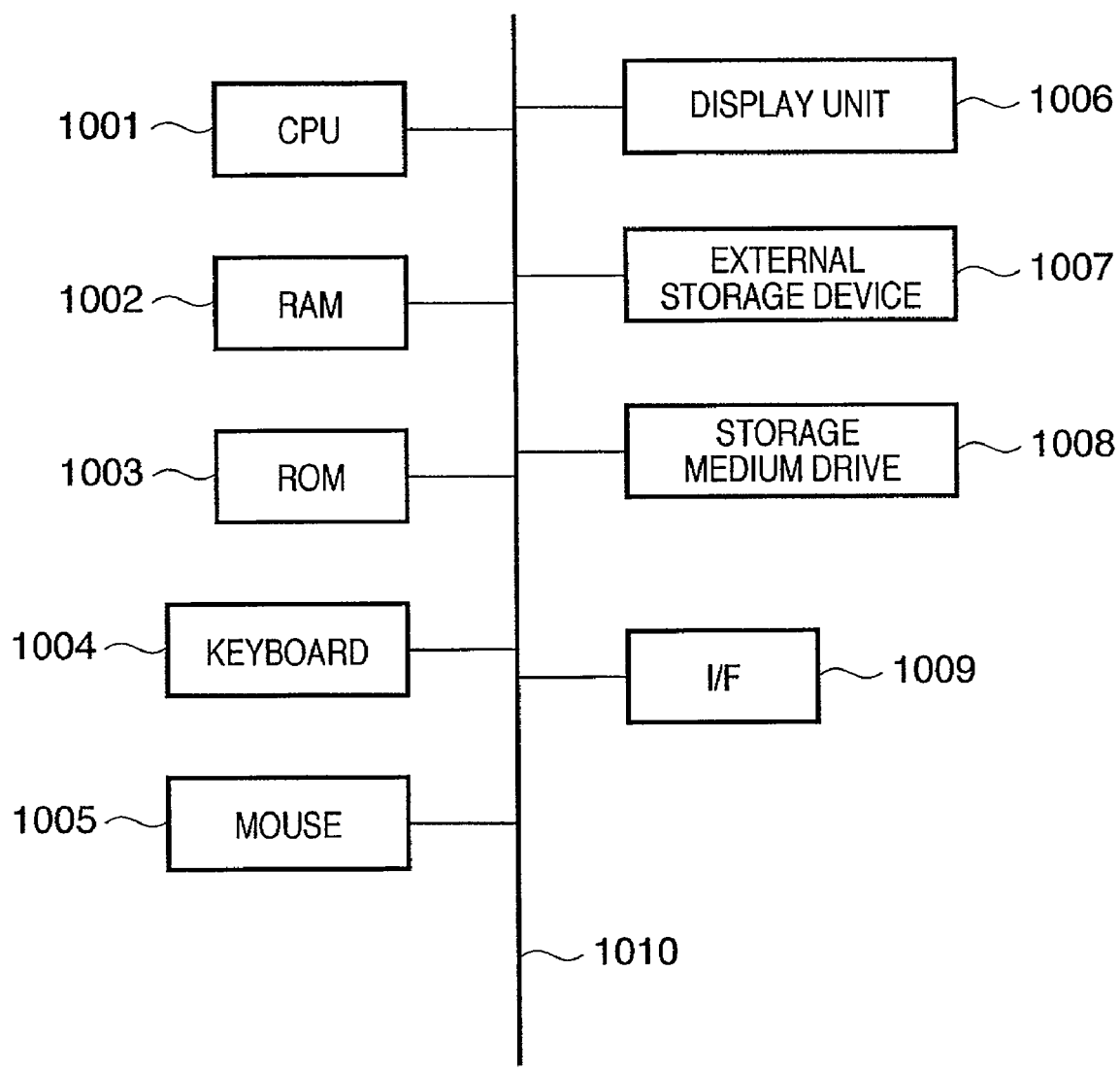
FIG. 3 is a block diagram showing the hardware arrangement of a computer which executes software when one or more units which configure a processor 300 shown in FIG. 1 are implemented by a program.

FIG. 3 is a block diagram showing the hardware arrangement of a computer that executes software, when one or more units of each unit which forms the processor 300 shown in FIG. 1 are implemented by programs included in the software.

A CPU 1001 controls the overall computer using programs and data stored in a RAM 1002 and ROM 1003, and executes respective processes to be implemented by the apparatus to which this computer is applied. For example, when the respective units which form the processor 300 shown in FIG. 1 are implemented by programs, the CPU 1001 executes these programs to execute the respective processes to be implemented by the processor 300 described in the first embodiment.

The RAM 1002 has an area for temporarily storing programs and data loaded from an external storage device 1007 and storage medium drive 1008. Also, the RAM 1002 has a work area required by the CPU 1001 in order to execute various processes. That is, the RAM 1002 can provide various areas as needed.

The ROM 1003 stores a boot program, setting data, and the like.

A keyboard 1004 and mouse 1005 are input devices. The user of this computer can input various instructions to the CPU 1001 using these devices. The user can input commands to the instruction unit 550 via these input devices.

A display unit 1006 comprises a CRT, liquid crystal display, or the like. The display unit 1006 can display, for example, messages to be displayed for the calibration operation. The display unit 1006 also comprises the functions of the display unit 400.

The external storage device 1007 serves as a large-capacity information storage device such as a hard disk drive or the like. The external storage device 1007 saves an OS (operating system), and programs and data for making the CPU 1001 execute the functions of the respective units that form the processor 300 shown in FIG. 1. The external storage device 1007 also saves pieces of given information described in the first embodiment and modifications to be described later, and generally required information for descriptive convenience. Various kinds of information saved in the external storage device 1007 are loaded onto the RAM 1002 under the control of the CPU 1001 as needed.

The storage medium drive 1008 reads out programs and data stored in a storage medium such as a CD-ROM, DVD-ROM, or the like in accordance with an instruction from the CPU 1001, and outputs them to the RAM 1002 or external storage device 1007.

An I/F 1009 includes a plurality of types of ports to be described below. A signal of a physical space image output from the video camera 100 is input via an analog video port or a digital I/O port such as IEEE1394 or the like. The sensor measured value signals output from the 3D position and orientation sensor 200 are input via a USB port or RS-232C port. In this manner, signals input to the respective ports of the I/F 1009 are fetched onto the RAM 1002 as data via the I/F 1009. The position and orientation of the video camera 100 calculated by the sensor measured value transformation unit 320 are externally output via an Ethernet™ port or the like as needed.

The aforementioned components are interconnected via a bus 1010.

Third Embodiment

Some modifications of the first embodiment will be made, as described hereinafter.

<Modification 1>

In the first embodiment, if the optimization processing has succeeded in step S5040, the solution obtained by that optimization processing is selected as calibration information. However, the processes of steps S5010 to S5030 may be executed for all the candidates of the approximate values of the second coordinate transformation information held by the calibration information calculation unit 540, and the solution obtained by the optimization processing which yields a minimum residual error may be selected as calibration information.

<Modification 2>

In the first embodiment, the calibration information calculation unit 540 holds a plurality of candidates of the approximate values of the second coordinate transformation information, and sets each candidate as the initial estimated values of the optimization processing. However, it is not indispensable to hold in advance the candidates of the approximate values of the second coordinate transformation information. For example, the calibration information calculation unit 540 may automatically generate the approximate values of the second coordinate transformation information in step S5010. For example, the orientation of the survey point as an approximate value of the second coordinate transformation information may be generated using a random number. In this case, in the second and subsequent processes, by adding a condition that a new orientation candidate must be separated by a predetermined angle or more from all orientation candidates generated so far, initial estimated values can be given exhaustively.

<Modification 3>

The first embodiment has explained the case in which the calibration apparatus and method thereof (information processing apparatus) are applied to calibration of the image display apparatus which uses the magnetic sensor FASTRAK available from Polhemus as the 3D position and orientation sensor 200. However, the 3D position and orientation sensor 200 of the image display apparatus which can be calibrated by the calibration apparatus and method thereof according to the first embodiment is not limited to FASTRAK. The application range does not depend on the types and products of position and orientation sensors, and any other position and orientation sensors can be calibrated.

<Modification 4>

In the first embodiment, the projected coordinates and identification numbers of indices are acquired by the image processing. However, the need for such processing can be obviated, and the user may manually input the projected coordinates and identification numbers of indices. In this case, the image processing unit 520 desirably comprises an arbitrary GUI which allows the user to easily input the index positions by, for example, designating those on the physical space image displayed on, for example, a work display by clicking a mouse button.

<Modification 5>

The first embodiment comprises the instruction unit 550 that allows the user to input control commands. However, such inputs are not always required. For example, every time the image processing unit 520 detects an index, its information may be added to the data list. When the data list satisfies the conditions, the calibration information calculation unit 540 may calculate calibration information.

<Modification 6>

In the first embodiment, the calibration unit 310 is one component in the image display apparatus. However, a calibration apparatus having the functions of the calibration unit 310 can be configured. In this case, the calibration apparatus receives the sensor measured values and physical space image, and outputs calculated calibration information. Also, a position and orientation measurement apparatus which comprises the 3D position and orientation sensor 200 and the processor including the calibration unit 310 and sensor measured value transformation unit 320 may be configured. In this case, the position and orientation measurement apparatus outputs the position and orientation of the video camera 100 on the world coordinate system.

<Modification 7>

In the first embodiment, the 3D position and orientation sensor 200 of the image display apparatus which presents mixed reality is calibrated. However, the present invention is not limited to such specific application range, and can be applied to any other applications for measuring the position and orientation of an image sensing device using a 3D position and orientation sensor.

Other Embodiments

The objects of the present invention can be achieved as follows. That is, a recording medium (or storage medium), which records a program code of software that can implement the functions of the above-mentioned embodiments is supplied to a system or apparatus. Of course, the recording medium is a computer-readable recording medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted into or connected to the computer. After that, the functions of the above-mentioned embodiments are implemented by some or all of actual processing operations executed by a CPU or the like arranged in the function expansion card or function expansion unit based on an instruction of the program code. Such a case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:

an image acquisition unit adapted to acquire a physical space image obtained by sensing a physical space on which a plurality of indices whose world coordinates are known are allocated using an image sensing device;

a coordinate acquisition unit adapted to acquire image coordinates of the indices in the physical space image with reference to the image sensing device;

a position and orientation acquisition unit adapted to acquire a measured value of a position and orientation of a survey point on the image sensing device in a coordinate system with reference to a sensor measured by the sensor;

a candidate acquisition unit adapted to acquire a plurality of candidates of second transformation information required to transform between a coordinate system with reference to the image sensing device and a coordinate system with reference to the survey point;

an estimation unit adapted to calculate an estimated value of a position and orientation of the image sensing device on the world coordinate system using the acquired image coordinates of the indices and the positions of the indices on the world coordinate system;

a calculation unit adapted to calculate first transformation information used to transform between the coordinate system with reference to the sensor and the world coordinate system using a selected one of the second transformation information selected from among the plurality of candidates of the second transformation information, the measured value of the position and orientation of the survey point on the coordinate system with reference to the sensor, and the estimated value of the position and orientation of the image sensing device on the world coordinate system; and a correction unit adapted to make iterative calculations for correcting calibration information used to calibrate the position and orientation in the coordinate system with reference to the sensor to the world coordinate system using, as initial values of the calibration information, the selected second transformation information and the calculated first transformation information.

2. The apparatus according to claim 1, wherein the candidates of the second transformation information are stored in advance.

3. The apparatus according to claim 1, wherein said candidate acquisition unit generates the candidates of the second transformation information using random numbers.

4. The apparatus according to claim 1, further comprising a unit adapted to check if the correction of the calibration information by said correction unit has succeeded.

5. The apparatus according to claim 1, said correction unit comprising a unit adapted to select calibration information with a smallest one of residual errors calculated by processing for correcting the calibration information.

6. The apparatus according to claim 1, further comprising:
a unit adapted to calibrate the position and orientation with reference to the sensor using the calibration information corrected by said correction unit; and
a unit adapted to output the calibrated position and orientation.

7. The apparatus according to claim 1, further comprising:
a generation unit adapted to calibrate the position and orientation with reference to the sensor using the corrected calibration information, and to generate a virtual space image seen from a viewpoint having the calibrated position and orientation; and
an output unit adapted to generate a composite image by compositing the generated virtual space image and the physical space image, and to output the composite image to a display device.

8. The apparatus according to claim 1, wherein said calculation means calculates the candidates of the first transformation information using the measured positions and orientations at different time points and the position and orientation of the image sensing device and calculates the first transformation information based on the candidates of the first transformation information.

9. An information processing apparatus for calculating calibration information of a sensor used to measure a position and orientation of an image sensing device, said apparatus comprising:
an input unit adapted to input measured values of the sensor at different positions and orientations of the image sensing device;
an acquisition unit adapted to acquire actually measured values of coordinates of a plurality of feature points included in images sensed by the image sensing device at the different positions and orientations; and
a calculation unit adapted to calculate the calibration information based on the plurality of measured values input by said input unit, the plurality of actually measured values acquired by said acquisition unit, and pre-stored world coordinates of the plurality of feature points,
wherein the calibration information includes first transformation information used to transform a position and orientation on a sensor coordinate system based on the sensor into a position and orientation on a world coordinate system, and second transformation information used to transform a position and orientation as measured values of a survey point by the sensor into a position and orientation on a coordinate system based on the image sensing device, and
said calculation unit comprises:
a first calculation unit adapted to calculate a position and orientation of the image sensing device based on the actually measured values of the coordinates of the feature points acquired by said acquisition unit and the world coordinates of these feature points at least at one position and orientation of the different positions and orientations;
a first setting unit adapted to set approximate values of the second transformation information;
a second calculation unit adapted to calculate approximate values of the first transformation information corresponding to the approximate values of the second transformation information set by said first setting unit based on the position and orientation of the image sensing device calculated by said first calculation unit and the measured values of the sensor at these position and orientation; and
a correction unit adapted to correct the calibration information based on the measured values of the sensor at the different positions and orientations input by said input unit and the actually measured values of the coordinates of the feature points at the different positions and orientations acquired by said acquisition unit using, as initial values of the calibration information, the approximate values of the second transformation information set by said first setting unit, and the approximate values of the first transformation information calculated by said second calculation unit.

10. An information processing method comprising:
an image acquisition step of acquiring a physical space image obtained by sensing a physical space on which a plurality of indices whose world coordinates are known are allocated using an image sensing device;
a coordinate acquisition step of acquiring image coordinates of the indices in the physical space image with reference to the image sensing device;
a position and orientation acquisition step of acquiring a measured value of a position and orientation of a survey point on the image sensing device in a coordinate system with reference to a sensor measured by the sensor;
a candidate acquisition step of acquiring a plurality of candidates of second transformation information required to transform between a coordinate system with reference to the image sensing device and a coordinate system with reference to the survey point;
an estimation step of calculating an estimated value of a position and orientation of the image sensing device on the world coordinate system using the acquired image coordinates of the indices and the positions of the indices on the world coordinate system;
a calculation step of calculating first transformation information used to transform between the coordinate system with reference to the sensor and the world coordinate system using a selected one of the second transformation information from among the plurality of candidates of the second transformation information, the measured value of the position and orientation of the survey point on the coordinate system with reference to the sensor, and the estimated value of the position and orientation of the image sensing device on the world coordinate system; and
a correction step of making iterative calculations for correcting calibration information used to calibrate the position and orientation in the coordinate system with reference to the sensor to the world coordinate system using, as initial values of the calibration information, the selected second transformation information and the calculated first transformation information.

11. An information processing method for calculating calibration information of a sensor used to measure a position and orientation of an image sensing device, the method comprising:
an input step of inputting measured values of the sensor at different positions and orientations of the image sensing device;
an acquisition step of acquiring actually measured values of coordinates of a plurality of feature points included in images sensed by the image sensing device at the different positions and orientations; and
a calculation step of calculating the calibration information based on the plurality of measured values input in the input step, the plurality of actually measured values acquired in the acquisition step, and pre-stored world coordinates of the plurality of feature points, wherein the calibration information includes first transformation information used to transform a position and orientation on a sensor coordinate system based on the sensor into a position and orientation on a world coordinate system, and second transformation information used to transform a position and orientation as measured values of a survey point by the sensor into a position and orientation on a coordinate system based on the image sensing device, and the calculation step comprises:

a first calculation step of calculating a position and orientation of the image sensing device based on the actually measured values of the coordinates of the feature points acquired in the acquisition step and the world coordinates of these feature points at least at one position and orientation of the different positions and orientations;

a first setting step of setting approximate values of the second transformation information;

a second calculation step of calculating approximate values of the first transformation information corresponding to the approximate values of the second transformation information set in the first setting step based on the position and orientation of the image sensing device calculated in the first calculation step and the measured values of the sensor at these position and orientation; and a correction step of correcting the calibration information based on the measured values of the sensor at the different positions and orientations input in the input step and the actually measured values of the coordinates of the feature points at the different positions and orientations acquired in the acquisition step using, as initial values of the calibration information, the approximate values of the second transformation information set in the first setting step, and the approximate values of the first transformation information calculated in the second calculation step.

12. A computer-readable storage medium storing a computer program for making a computer execute an information processing method according to claim 10.

* * * * *